US006809806B1

(12) United States Patent
Carnevale et al.

(10) Patent No.: US 6,809,806 B1
(45) Date of Patent: Oct. 26, 2004

(54) APPARATUS AND METHOD FOR VERIFYING THE BEAM AXIS OF FRONT-LOOKING LAND VEHICLE TRANSCEIVER ANTENNA

(75) Inventors: Gregory S. Carnevale, Chatham (CA); David Raheb, Leamington (CA); Paul R. Lefebvre, Chatham (CA); Douglas J. O'Hara, Chatham (CA)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/445,679

(22) Filed: May 27, 2003

(51) Int. Cl.[7] .......................... G01B 11/26; G01S 7/40

(52) U.S. Cl. .................. 356/141.2; 356/138; 356/140; 342/167; 342/174

(58) Field of Search ............................... 342/167, 174; 343/711–717, 766; 180/167–169; 356/4.02, 138, 140, 141.2

(56) References Cited

U.S. PATENT DOCUMENTS

| | | | | |
|---|---|---|---|---|
| 6,020,844 A | * | 2/2000 | Bai et al. | 342/165 |
| 6,329,952 B1 | * | 12/2001 | Grace | 343/703 |
| 6,714,156 B1 | * | 3/2004 | Ibrahim et al. | 342/174 |

* cited by examiner

*Primary Examiner*—Thomas H. Tarcza
*Assistant Examiner*—Isam Alsomiri
(74) *Attorney, Agent, or Firm*—Jeffrey P. Calfa; Denise Kelly Sullivan; Susan L. Lukasik

(57) ABSTRACT

Apparatus and method for measuring the angle of elevation of the beam axis (90) of a front-looking radar antenna (68). A first fixture (140) has an indicator (120) for indicating angle of elevation and a first laser (148) aimed in a direction that, as viewed normal to a horizontal surface (192) on which the vehicle is disposed, is parallel to the beam axis for shining on a target (144). A second fixture (142) has a second laser (174) aimed in a direction that, as viewed normal to the horizontal surface, is parallel to the direction of forward vehicle travel for shining on the target. The angle of elevation indicated on the indicator is used as a measure of the angle of elevation of the beam axis of the antenna and the azimuth of the beam axis is verified by the two laser beams shining in a predetermined relationship to each other on the target.

31 Claims, 13 Drawing Sheets

FIG. 6
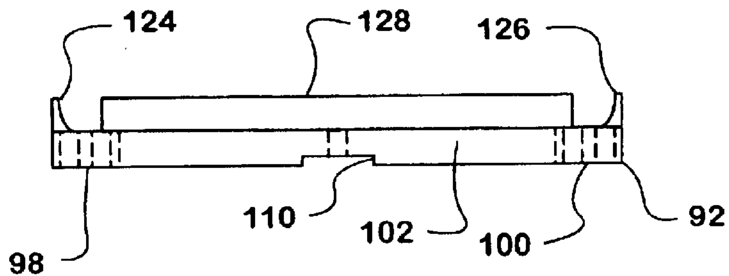
FIG. 7
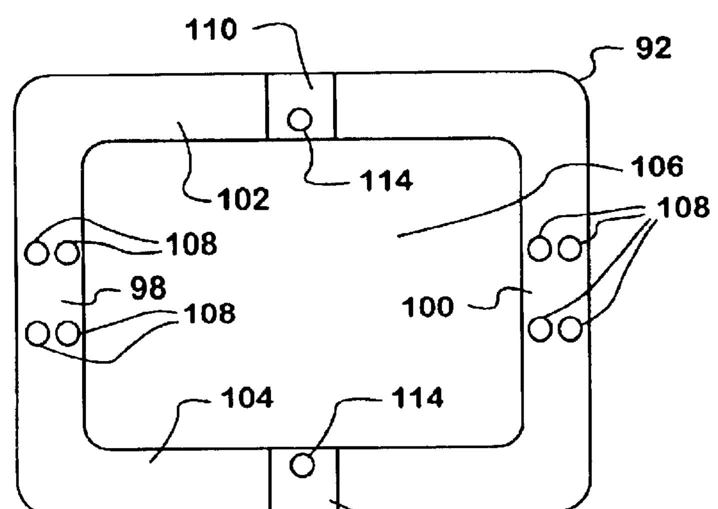
FIG. 5
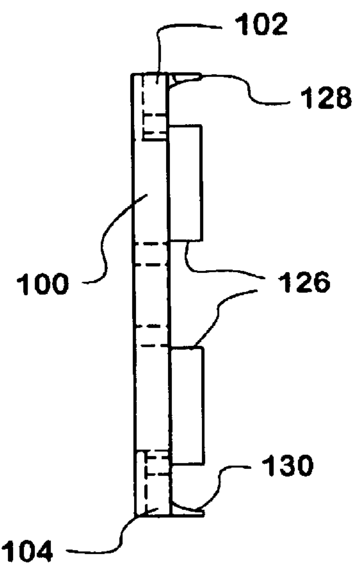
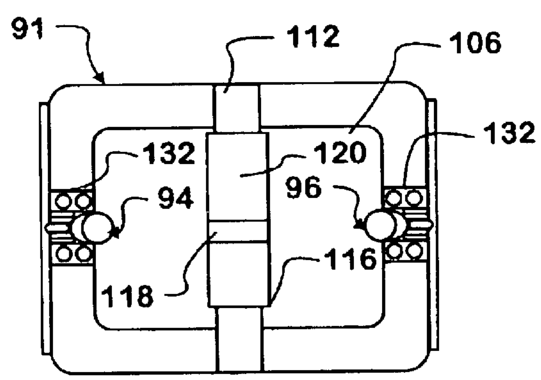
FIG. 8
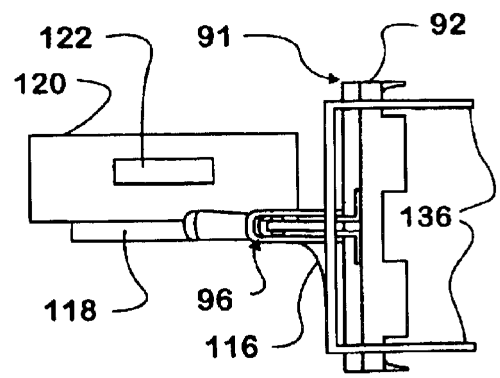
FIG. 9

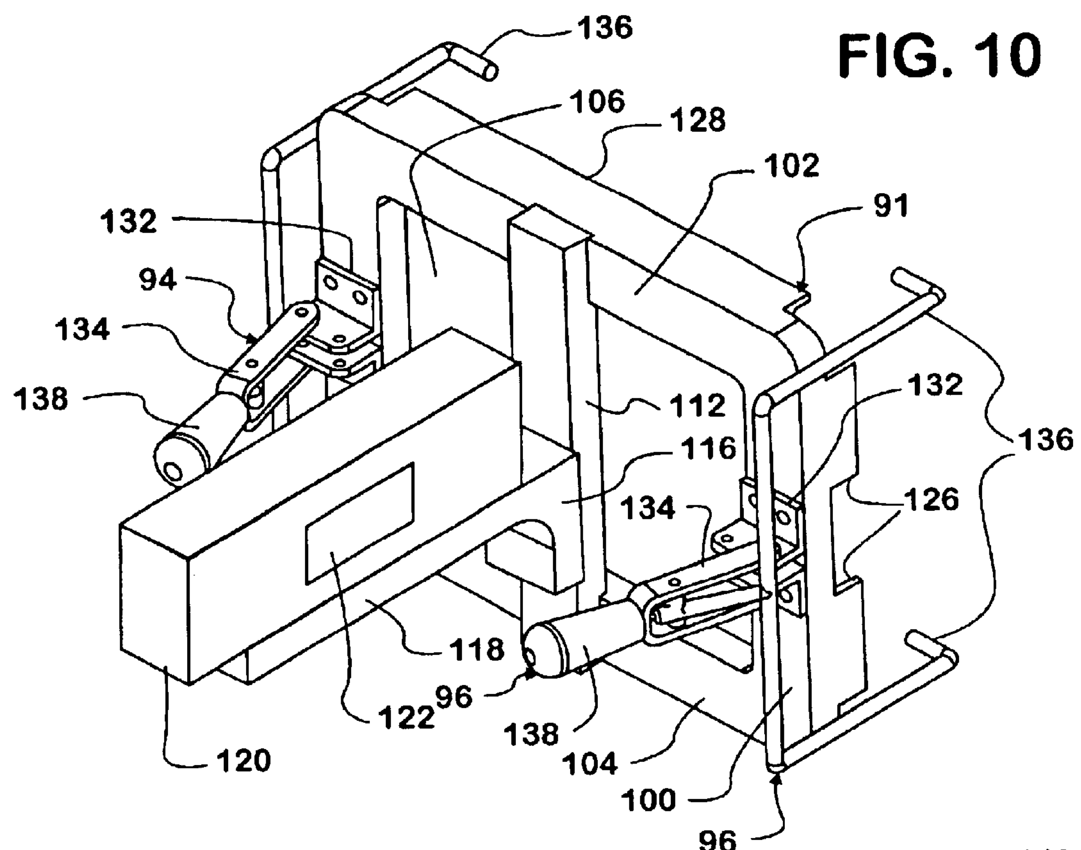
FIG. 10
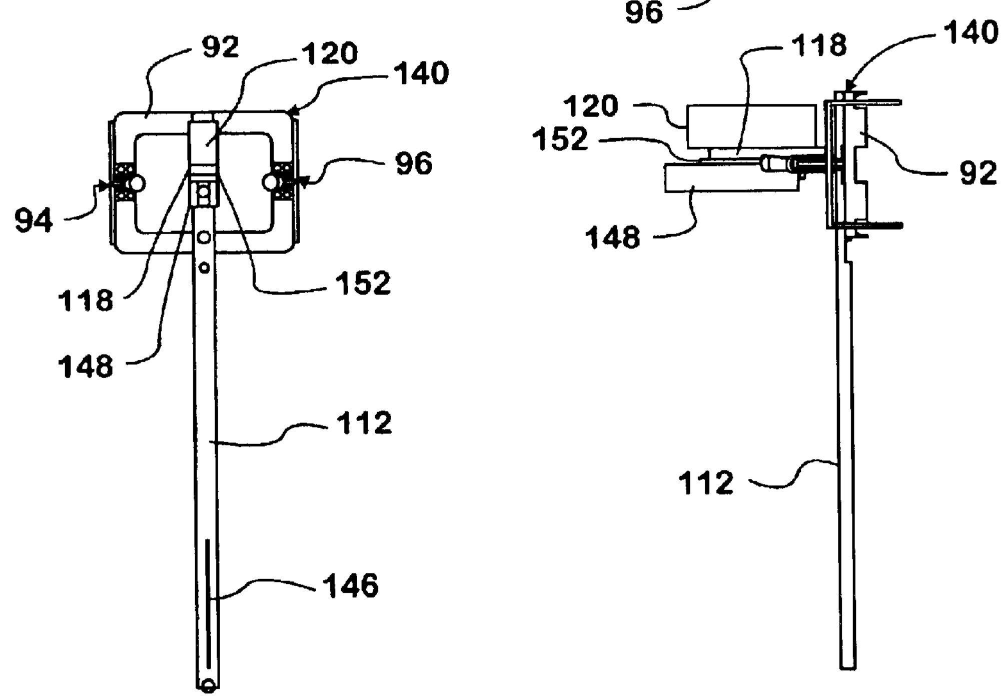
FIG. 11
FIG. 12

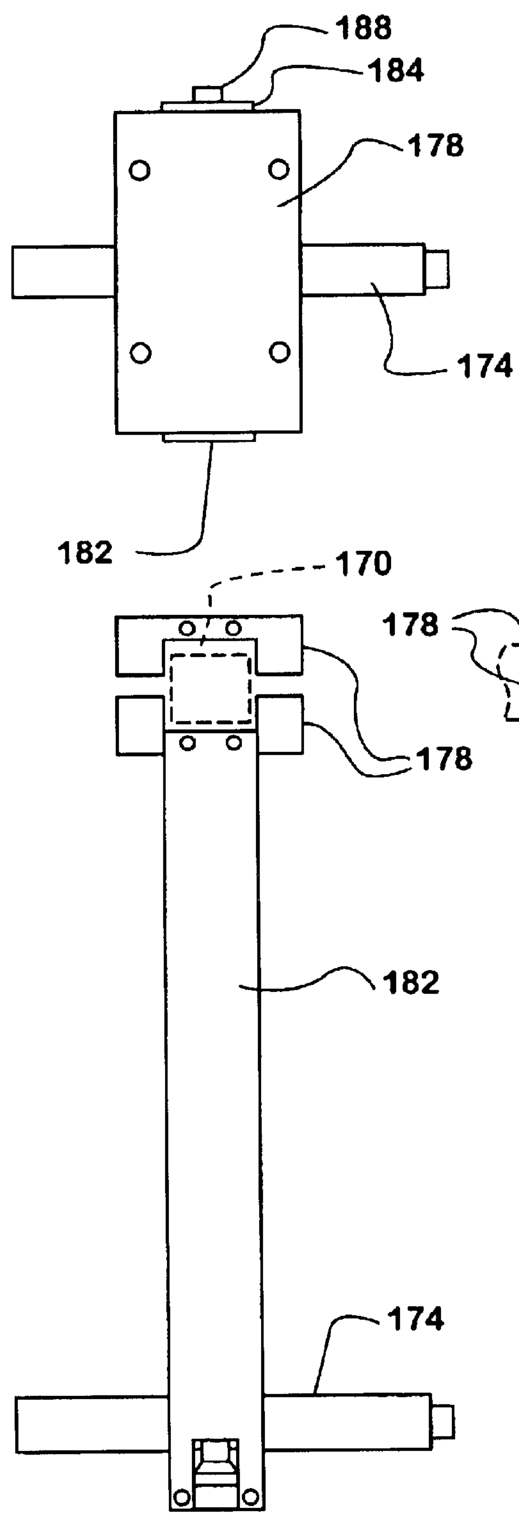
FIG. 18
FIG. 17
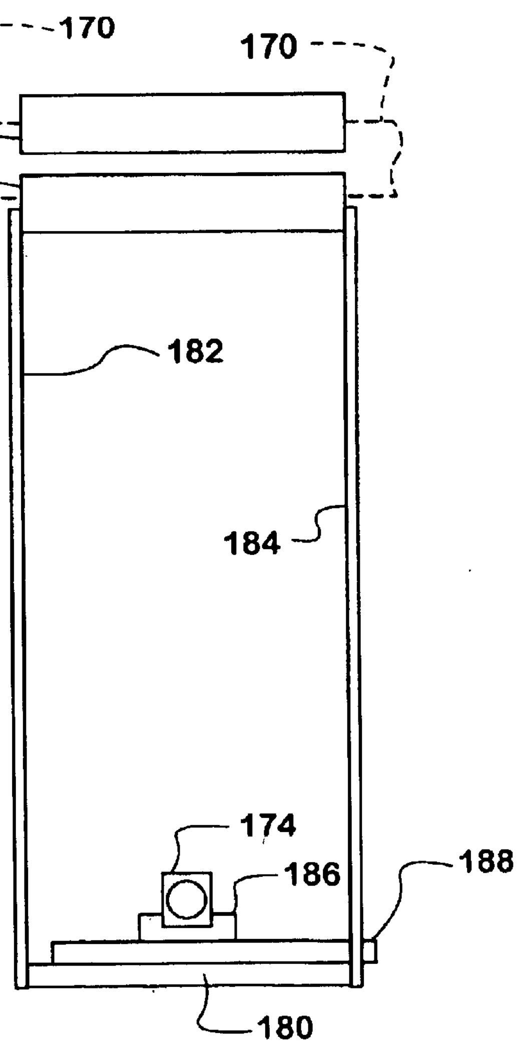
FIG. 16

FIG. 19
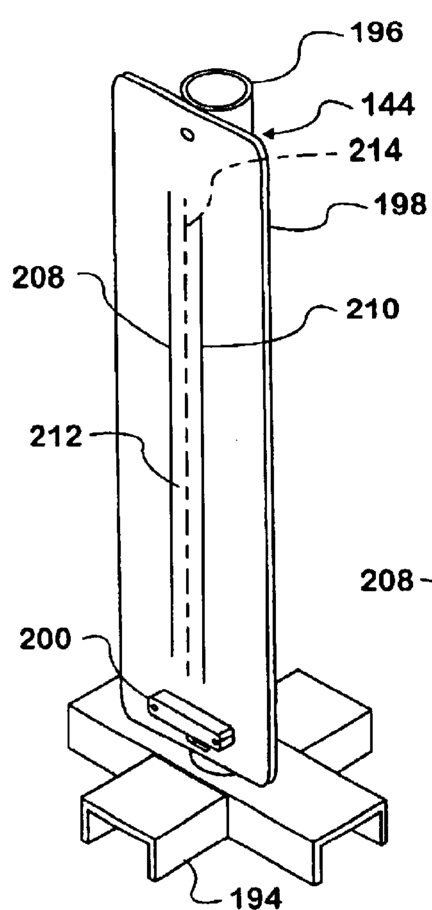
FIG. 22
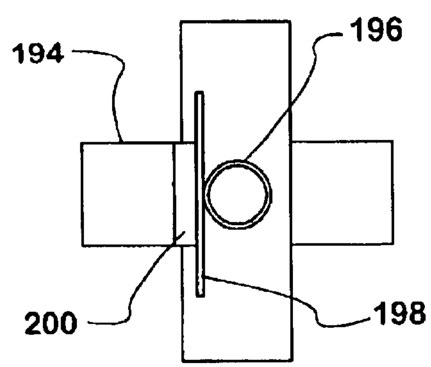
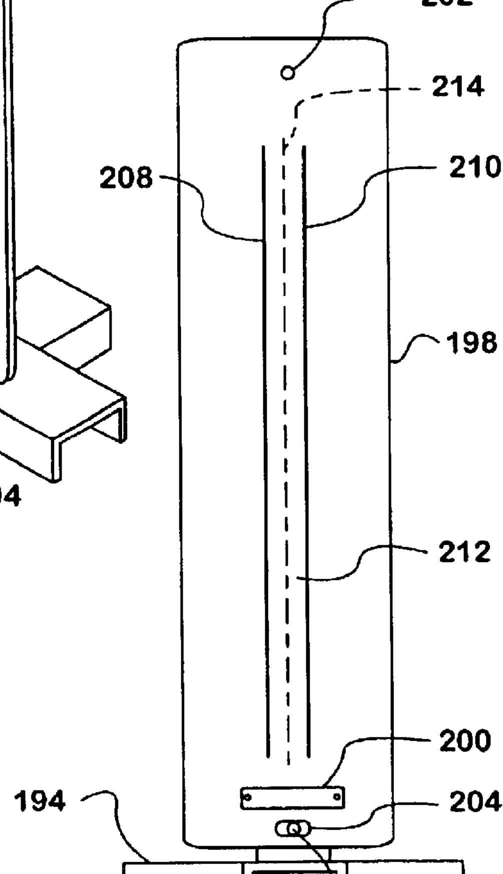
FIG. 20
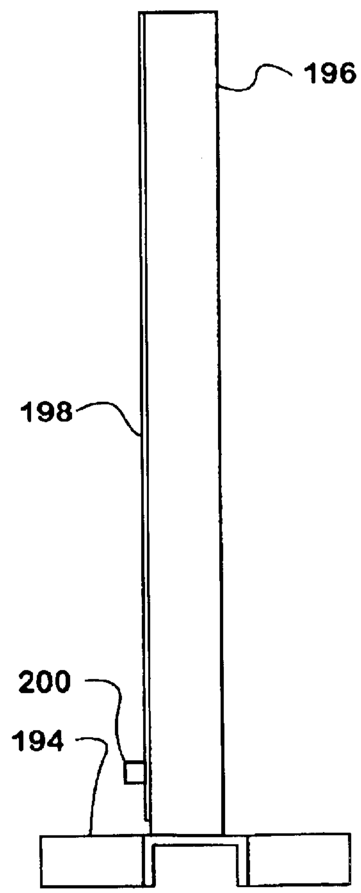
FIG. 21

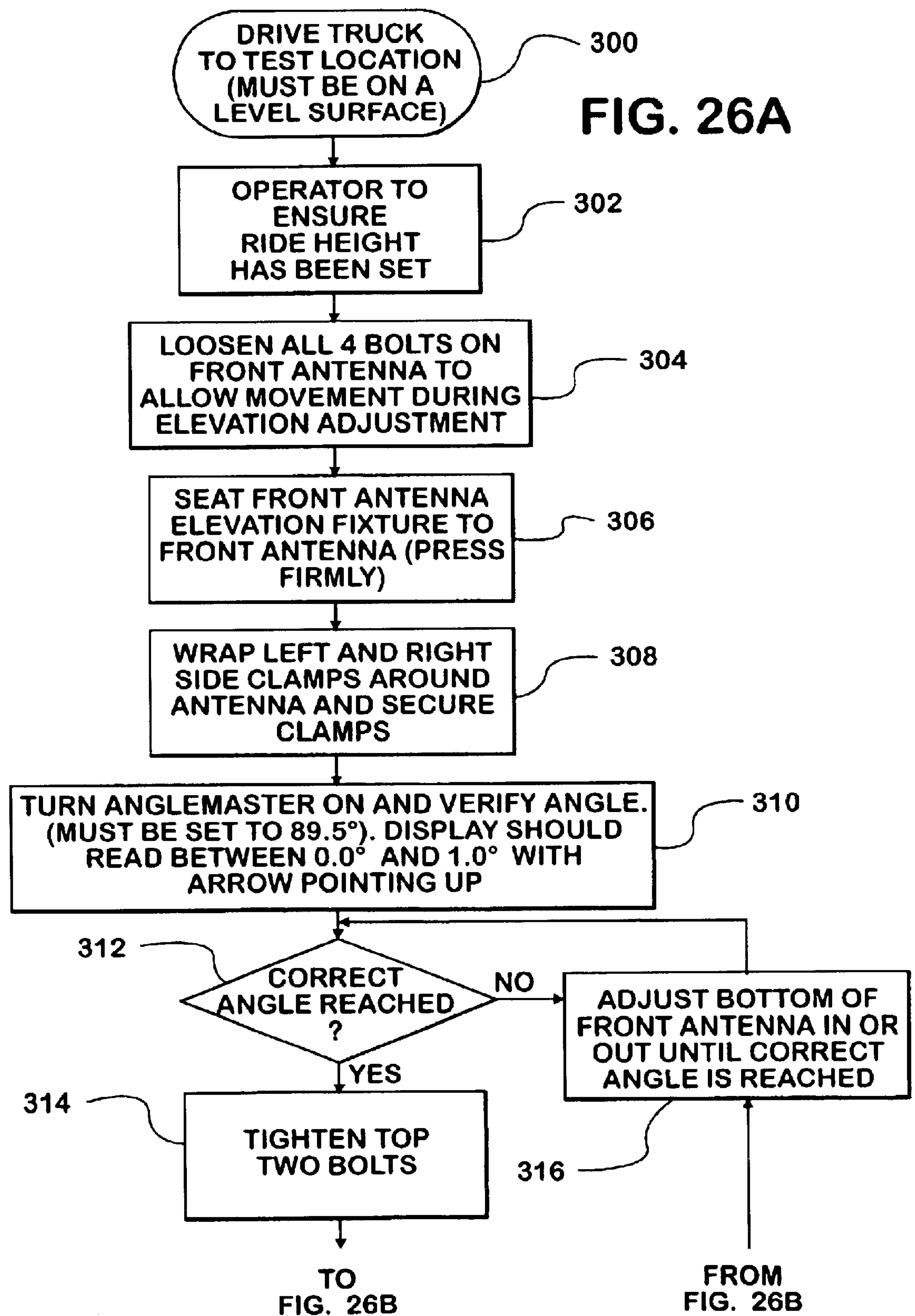
DRIVE TRUCK TO TEST LOCATION (MUST BE ON A LEVEL SURFACE)
300
FIG. 26A
OPERATOR TO ENSURE RIDE HEIGHT HAS BEEN SET
302
LOOSEN ALL 4 BOLTS ON FRONT ANTENNA TO ALLOW MOVEMENT DURING ELEVATION ADJUSTMENT
304
SEAT FRONT ANTENNA ELEVATION FIXTURE TO FRONT ANTENNA (PRESS FIRMLY)
306
WRAP LEFT AND RIGHT SIDE CLAMPS AROUND ANTENNA AND SECURE CLAMPS
308
TURN ANGLEMASTER ON AND VERIFY ANGLE. (MUST BE SET TO 89.5°). DISPLAY SHOULD READ BETWEEN 0.0° AND 1.0° WITH ARROW POINTING UP
310
312
CORRECT ANGLE REACHED ?
NO
ADJUST BOTTOM OF FRONT ANTENNA IN OR OUT UNTIL CORRECT ANGLE IS REACHED
YES
314
TIGHTEN TOP TWO BOLTS
316
TO FIG. 26B
FROM FIG. 26B

APPARATUS AND METHOD FOR VERIFYING THE BEAM AXIS OF FRONT-LOOKING LAND VEHICLE TRANSCEIVER ANTENNA

FIELD OF THE INVENTION

This invention relates to apparatus and method for verifying the aim of certain accessory equipment on a land vehicle, more especially apparatus and method for verifying the beam axis of a front-looking radar antenna on a land motor vehicle, such as a heavy truck.

BACKGROUND OF THE INVENTION

The continuing expansion of the application of electronic devices and systems to motor vehicles has enabled vehicles to be equipped with radar systems that can look in the forward direction of vehicle travel to disclose objects that may present a hazard to the vehicle. A Doppler radar transceiver enables the detection of objects that a driver of the vehicle may be unable to visually perceive.

An important aspect of equipping a vehicle with such a radar system involves properly aiming a front-looking antenna. The antenna must be aimed with a sufficient degree of accuracy to assure a correct final alignment of the antenna beam axis for detecting objects in the path of forward vehicle travel. In this regard, proper angles of the antenna beam axis in both elevation and azimuth are particularly important.

New motor vehicles are typically assembled on assembly lines where it is important for assembly operations to be conducted with dispatch, efficiency, and accuracy. While a level indicating instrument, such as a digital level, could be quickly placed by hand on an antenna to measure its angle of elevation after the antenna has been installed as a vehicle is being assembled on an assembly line, manual placement of such an instrument on an antenna may not occur with sufficient accuracy and/or repeatability to consistently assure a final mounting that provides proper antenna alignment, particularly in elevation. Moreover, a particular shape of an antenna may not be conducive to use of such an instrument, which often requires placement on a flat surface.

Consequently, a preferred practice is to complete the installation of the antenna at an off-line operation where the antenna can be finally secured in the proper alignment. Efficiency, dispatch, and accuracy remain important in an off-line operation.

SUMMARY OF THE INVENTION

The present invention relates to apparatus and method for accomplishing proper antenna alignment with efficiency, dispatch, and accuracy.

The apparatus comprises fixtures that are secured to the antenna and vehicle respectively by attending personnel. Once the fixtures have been so secured, the attending personnel perform additional procedures for verifying proper antenna alignment and securing the antenna in proper alignment.

The inventive apparatus and method are concerned initially with measuring, and if necessary adjusting, the angle of elevation of the antenna beam axis, and then securing the antenna once the proper angle of elevation has been verified by measurement. The method for measuring angle of elevation comprises securing to the antenna a fixture that comprises an indicator for indicating angle of elevation. The fixture comprises a locator for fitting congruently to a perimeter rim of the antenna and a mechanism for releasably securing the locator to the antenna to correlate the locator to the angle of elevation of the antenna beam axis. An indicator mounted on the locator indicates the angle of elevation of the locator, and hence the angle of elevation of the antenna.

A further, but optional, aspect of the method assures that the beam axis of the antenna is properly positioned in azimuth to be parallel to the thrust angle of the vehicle. The fixture just described is modified to include a first optical laser for emitting a first laser beam in a direction that, as viewed normal to a horizontal surface on which the vehicle is disposed for travel, is parallel to the beam axis of the antenna. A second fixture comprises a second optical laser that emits a second laser beam aimed in a direction that, as viewed normal to the horizontal surface, is parallel to the direction of forward vehicle travel, or thrust angle of the vehicle. The second laser is aligned with the first laser such that their respective beams are contained in a common vertical plane. A target is placed on the horizontal surface in front of the vehicle such that the second laser beam shines on a vertical centerline of a defined zone on a vertical face of the target. The first laser is then turned on to shine its beam on the target. Proper alignment in azimuth is indicated by the first laser beam shining within the defined zone on the target face.

Accordingly, one general aspect of the present invention relates to a method for measuring the angle of elevation of the beam axis of a front-looking radar antenna on a land vehicle, as just described.

A further aspect relates to a method for verifying the alignment of the antenna beam axis in azimuth, as just described.

Another general aspect of the present invention relates to a method for measuring the angle of elevation at which a device mounted on a land vehicle radiates electromagnetic radiation along a beam axis that, as viewed normal to a horizontal surface on which the vehicle is disposed for travel, is parallel to a direction of travel of the vehicle along the surface.

The method comprises securing to the device a fixture that comprises at least an indicator for indicating angle of elevation. The fixture comprises a locator for fitting congruently to a perimeter rim of the device and a mechanism for releasably securing the locator to the device to correlate the locator to the angle of elevation of the beam axis. An indicator mounted on the locator indicates the angle of elevation of the locator, and hence the angle of elevation of the beam axis.

A further aspect relates to a method for verifying the alignment of the beam axis in azimuth using a modified first fixture and a second fixture, as described earlier.

Still another general aspect of the present invention relates to apparatus for measuring the angle of elevation at which a device mounted on a land vehicle radiates electromagnetic radiation along a beam axis that, as viewed normal to a horizontal surface on which the vehicle is disposed for travel, is parallel to a direction of travel of the vehicle along the surface.

The apparatus comprises a fixture that comprises a locator for fitting congruently to a perimeter rim of the device and a mechanism for releasably securing the locator to the device to correlate the locator to the angle of elevation of the device, and an indicator mounted on the locator for indicating angle of elevation of the locator, and hence angle of elevation of the device.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIGS. 5, 6, and 7 are respective front, top plan, and side views of a locator of a first embodiment of a first fixture that associates with the antenna pursuant to certain principles of the invention.

FIGS. 8, 9, and 10 are respective front, side, and perspective views of the complete first embodiment of first fixture, FIG. 10 being on an enlarged scale.

FIGS. 11, 12, and 13 are respective front, side, and perspective views of a second embodiment of first fixture, FIG. 13 being on an enlarged scale.

FIG. 14 is a top plan view in the direction of arrows 14—14 in FIG. 13, with one element of the fixture removed.

FIGS. 15, 16, 17, and 18 are respective perspective, front, side, and top plan views of a portion of a second fixture that associates with the vehicle pursuant to additional principles of the invention.

FIGS. 19, 20, 21, and 22 are respective perspective, front, side, and top plan views of a target that is used in conjunction with the first and second fixtures pursuant to the additional principles of the invention.

FIGS. 26A and 26B collectively form a flow diagram of steps in the practice of one portion of the method.

DESCRIPTION OF THE PREFERRED EMBODIMENT

Figure 1:
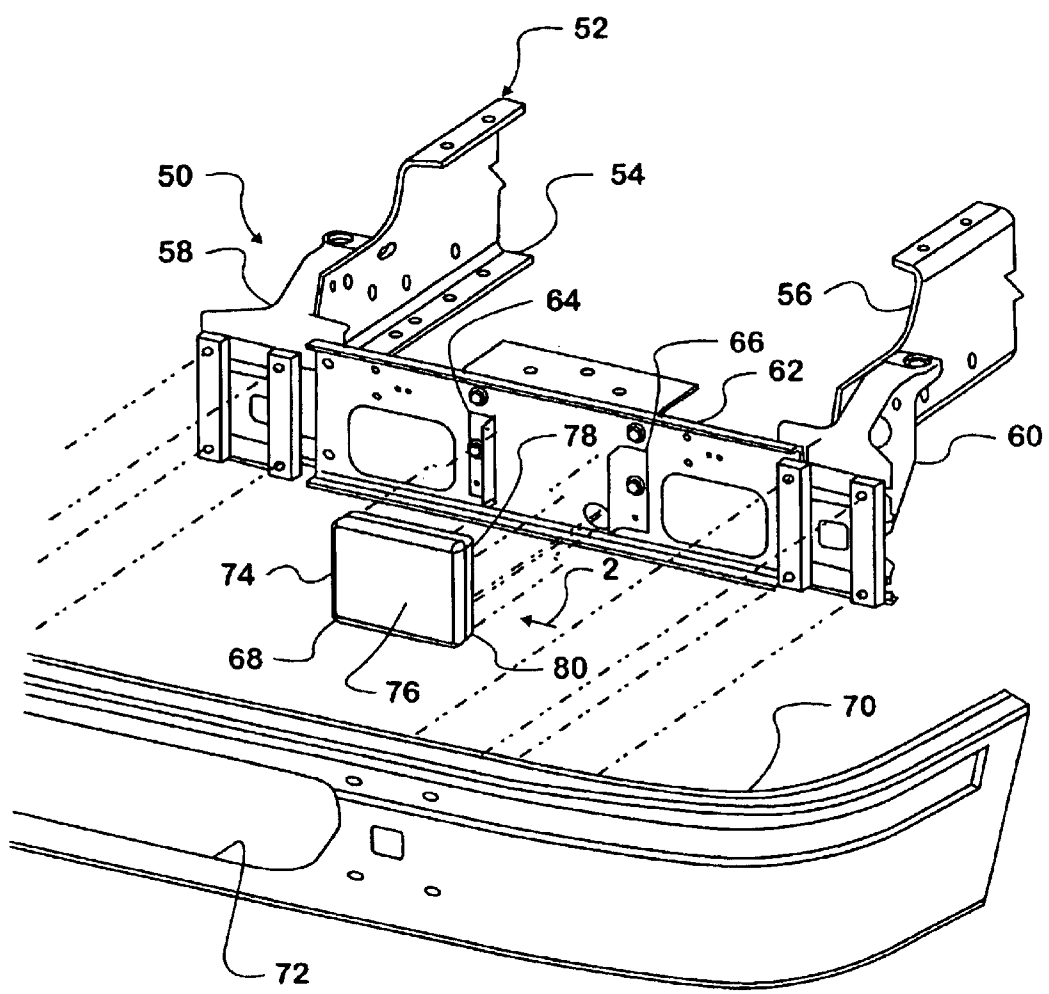
FIG. 1 is a partly exploded, fragmentary perspective view of a portion of the front undercarriage of a motor vehicle having a forward-looking radar antenna.

FIG. 1 shows the front of a motor vehicle undercarriage 50, this particular example of motor vehicle being a heavy truck. Undercarriage 50 comprises a chassis frame 52 having right and left (as referenced to the vehicle) side rails 54, 56 respectively. Right and left brackets 58, 60 at the front of side rails 54, 56 respectively serve to attach a front cross member 62 spanning the side rails.

Two antenna mounting brackets 64, 66 for mounting an antenna 68 are fastened to the front face of cross member 62 substantially symmetrically opposite about an imaginary vertical plane passing centrally through the length of the vehicle. A bumper 70 fastens to front faces of brackets 58, 60 frontally of cross member 62, and at its center comprises an opening 72 through which antenna 68 can transmit electromagnetic radiation and receive reflected radiation.

Antenna 68 comprises a casing 74 of a generally rectangular shape providing a generally rectangular front face 76. An antenna element that transmits and receives the emitted and reflected radiation is internal of casing 74 behind face 76. At each of its right and left vertical sides, casing 74 comprises upper and lower threaded holes 78, 80.

Figure 3:
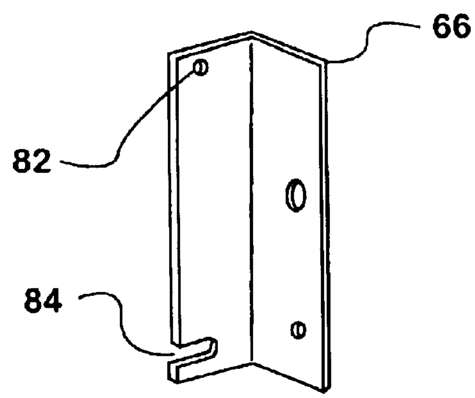
FIG. 3 is a perspective view of one of two parts that mount the antenna on the undercarriage.

Each bracket 64, 66 comprises sheet metal stamped to a right angle to provide several attachment features. FIG. 3 shows bracket 66 by itself. Bracket 64 is the mirror image of bracket 66. Attachment features comprise holes in the flange of each bracket that is disposed against cross member 62 for fastening each bracket to the cross member by suitable fasteners, and in the other flange, an upper hole 82 and a lower slot 84 for fastening to casing 74 when antenna 68 is disposed between the two brackets, as suggested by FIG. 1.

Figure 2:
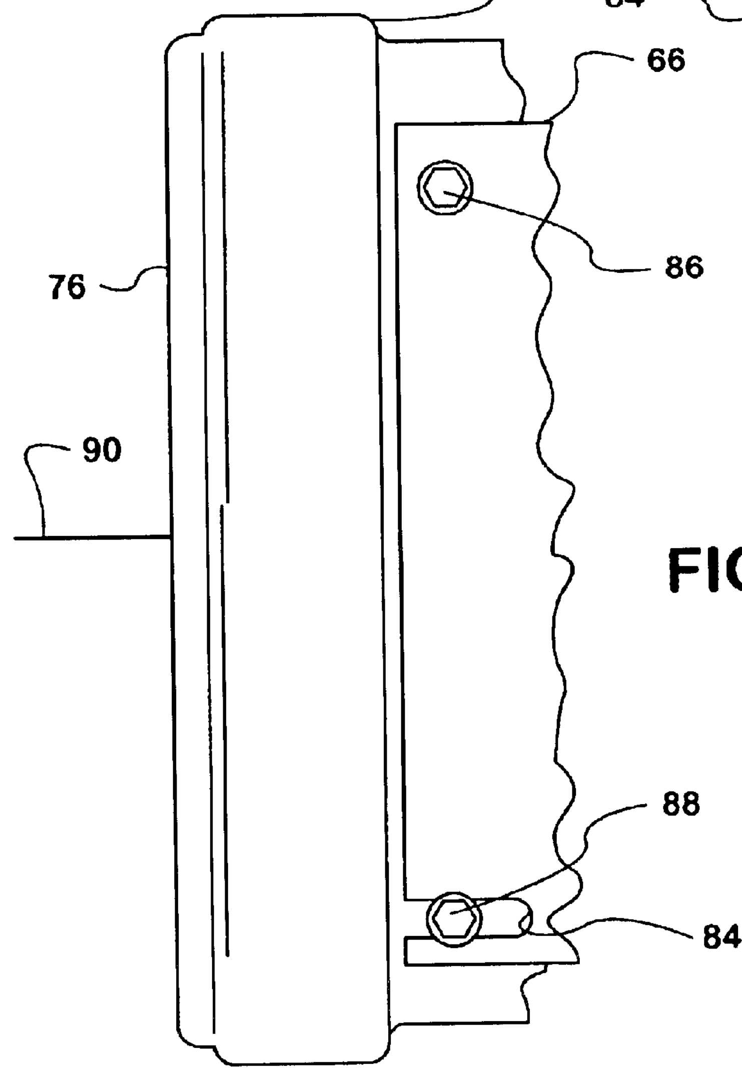
FIG. 2 is an enlarged, fragmentary side elevation view in the general direction of arrow 2 in FIG. 1 showing the antenna assembled to the undercarriage.
Figures 13, 14, 15:
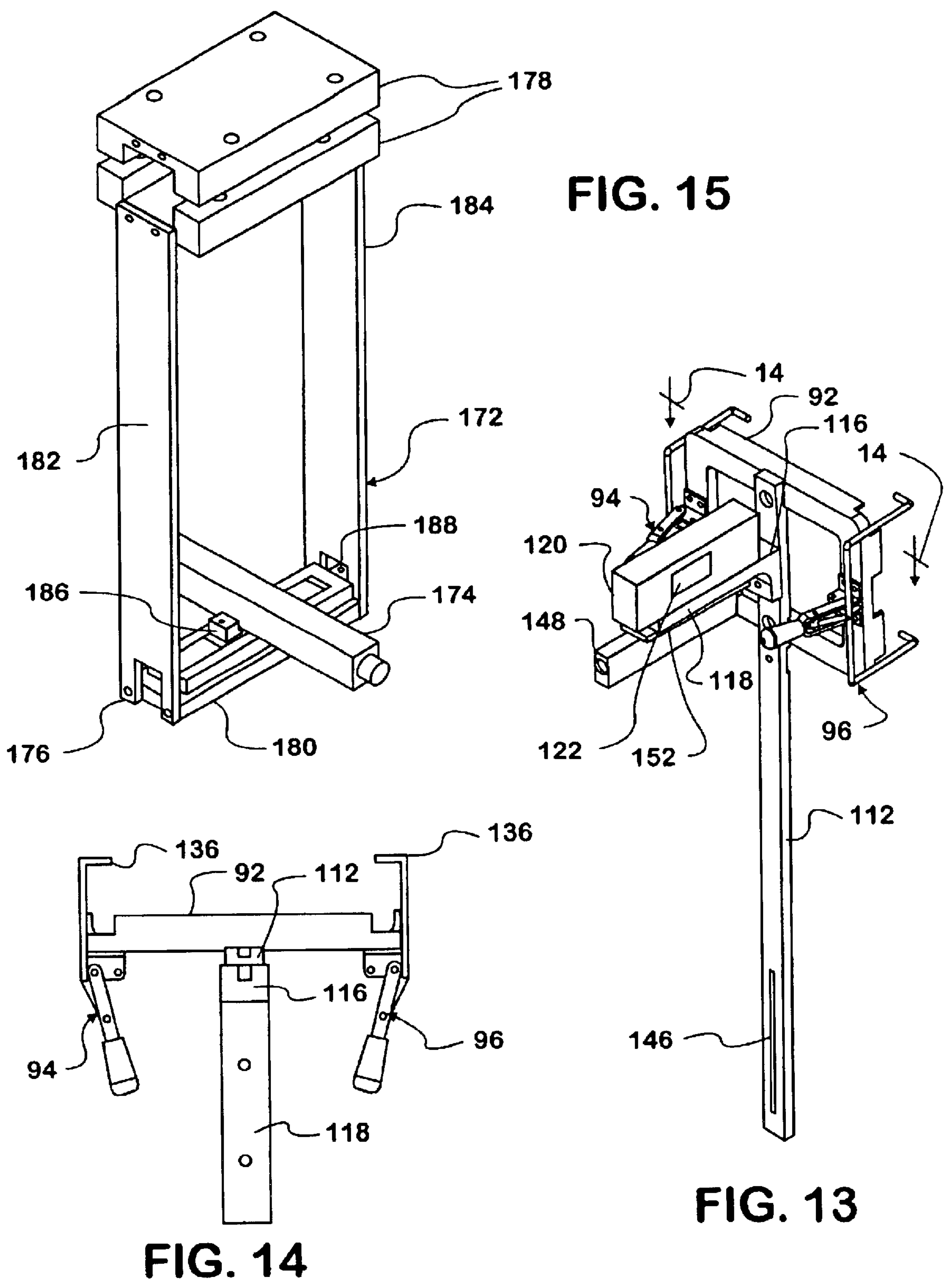
Figure 24:
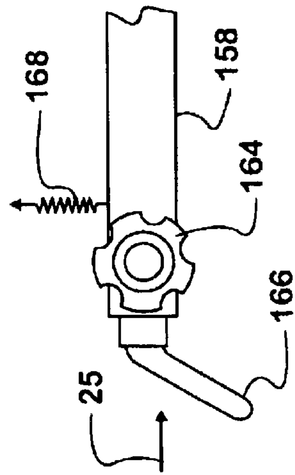
FIG. 24 is an enlarged view in circle 24 in FIG. 23.
Figure 25:
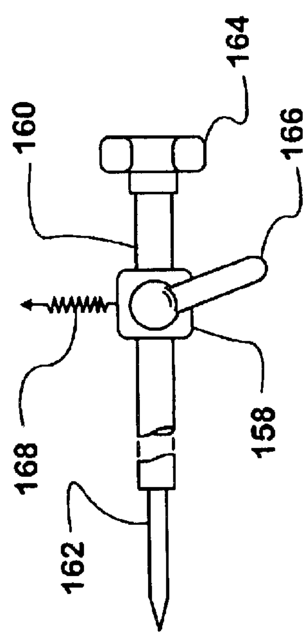
FIG. 25 is a view in the direction of arrow 25 in FIG. 24, showing another portion of the second fixture in greater detail.

With antenna 68 so disposed, FIG. 2 shows a threaded fastener 86 passing through hole 82 in bracket 66 and threading into hole 78 in the left side of antenna casing 74. A threaded fastener 88 passes through slot 84 in bracket 66 and threads into hole 80 in the left side of antenna casing 74. Although not specifically shown in the drawing, another threaded fastener passes through hole 82 in bracket 64 and threads into hole 78 in the right side of antenna casing 74, and still another threaded fastener passes through slot 84 in bracket 64 and threads into hole 80 in the right side of antenna casing 74.

The antenna element is disposed within casing 74 such that antenna 68 comprises a beam axis 90 that is perpendicular to and centered on front face 76. It is along this axis that electromagnetic waves from the antenna element propagate. For desired operation of the warning system associated with antenna 68, it is important that antenna 68 be mounted on the vehicle in a manner that accurately positions beam axis 90 both in azimuth and elevation. It is toward securing such a mounting that the apparatus and method of the present invention are directed.

The apparatus comprises a first fixture 91 that will be described with reference to FIGS. 5–10. Fixture 91 is sufficient by itself for indicating the angle of elevation of beam axis 90 and comprises a locator 92 for fitting congruently to the perimeter rim of antenna casing 74 and toggle clamp mechanisms 94, 96 at right and left sides of locator 92 for releasably clamping fixture 91 to casing 74. When locator 92 is congruently fit to casing 74, the plane of the locator is parallel to antenna face 76.

Locator 92 comprises a rectangular perimeter frame fabricated by conventional molding processes from UHMW (ultra-high molecular weight) plastic to impart strength and dimensional stability to it. The perimeter frame has four sides, two of which 98, 100 are vertical and two of which 102, 104 are horizontal, bounding a rectangular open space 106. Hole patterns 108 at the midpoints of sides 98, 100 provide for the respective toggle clamp mechanisms 94, 96 to be attached to locator 92. At the front face of the frame, sides 102, 104 comprise vertically aligned notches 110 at their midpoints. Notches 110 serve to locate and seat a vertical rectangular bar 112 parallel to the plane of locator 92. Bar 112 vertically spans space 106 half-way between sides 98, 100 and is fastened to sides 102, 104 by fasteners that pass through holes 114 at each notch 110.

An indicator support bracket 116 is disposed against the front face of bar 112 and fastened to the bar to provide a mounting platform 118 for an angle of elevation indicator 120. The top surface of mounting platform 118 is perpendicular to bar 112, and consequently to the plane of the perimeter frame of locator 92. With the flat bottom face of indicator 120 disposed flat against the top surface of platform 118, indicator 120 will therefore indicate, in degrees, the inclination of the plane of locator 92 relative to vertical. With that relationship, indicator 120 also serves to indicate the angle of elevation of beam axis 90 relative to vertical when 92 locator is congruently fit to the rim of casing 74 and clamped to the casing by toggle clamp mechanisms 94,96.

Each for the four sides 98, 100, 102, 104 of the perimeter frame of locator 92 comprises a rearwardly directed flange, or lip, 124, 126, 128, 130 respectively. The inner edge of each lip is radiused to the respective frame side where the lip joins the frame. The four lips are non-contiguous at the four corners of the frame. Lips 128, 130 are continuous while lips 124, 126 are discontinuous, being interrupted midway along their lengths to provide dimensional clearance for the mounting and operation of toggle clamp mechanisms 94, 96. The vertical distance between the distal ends of lips 128, 130 and the horizontal distance between the distal ends of lips 124, 126 are respectively just slightly greater than the height and width respectively of casing 74 to allow locator 92 to fit over and against front face 76 with the perimeter of the casing rim snuggly bounded by the four lips and the plane of locator 92 in parallelism with that of front face 76.

Each toggle clamp mechanism 94, 96 comprises a base 132 that attaches to locator 92 and provides a vertical hinge axis for a lever 134. A two-prong wire clamp 136 is pivoted vertically on lever 134 at a location between base 132 and a grip 138 at the end of lever 134. When levers 134 are swung outboard of sides 98, 100, the prongs of wire clamps 136 can be placed behind the rear face of antenna casing 74. Swinging the levers inboard while the prongs remain behind the casing, forces the casing to be clamped between locator 92 and the wire clamp prongs. The toggles are designed to go slightly over-center, thereby securing fixture 91 to antenna 68.

Indicator 120 is, by way of example, a device sold under the tradename ANGLEMASTER II®. It comprises a visual readout display 122 of the angle at which it is inclined lengthwise. If it is assumed that the azimuth of beam axis 90 is parallel to the forward direction of travel of the vehicle when the vehicle is on a flat horizontal surface, such as surface 192 in FIG. 23, the angle presented on display 122 directly correlates with the angle of elevation of beam axis 90. Display 122 is electronically operated to display the magnitude of the angle at which it is inclined. An electronic arrow at one end points either up or down to indicate the direction of inclination.

For the particular antenna and warning system in the example being described here, an angle of elevation at 89.5°, as measured from a nadir-pointing vertical line, is desired. Allowing a tolerance of 0.5°, positive or negative, an acceptable range is between 89° and 90° from nadir. Consequently if indictor 120 is perfectly horizontal, display 122 can be set to show an angle of 0°, corresponding to an angle of elevation of 90° for the antenna. If the antenna is aimed downward so that its beam axis has an angle of elevation corresponding to 89° from nadir, then display 122 will show an angle of 1°, with the up-down arrow pointing down.

Figure 23:
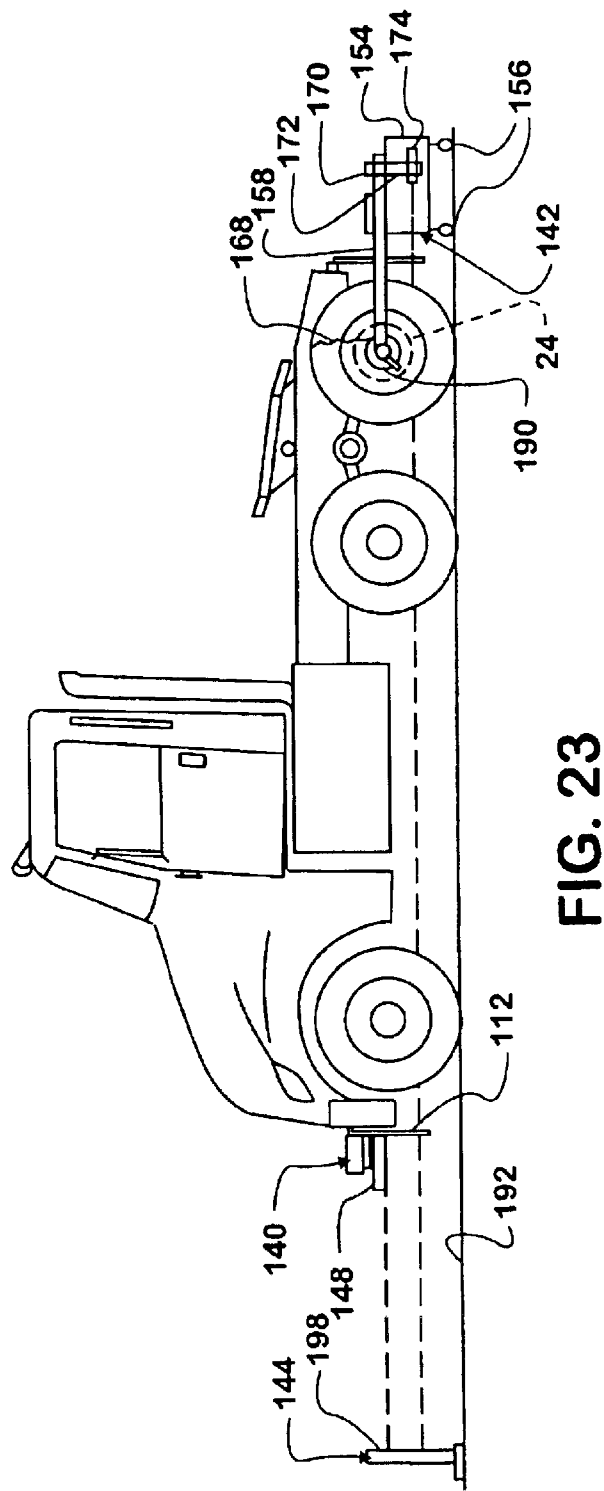
FIG. 23 is a side elevation view of the complete vehicle showing practice of the inventive method with the second embodiment of the first fixture and the second fixture respectively associated with the antenna and the vehicle respectively and with the target placed frontally of the vehicle.

For verifying that the azimuth of beam axis 90 is parallel to the forward direction of travel of the vehicle when the vehicle is on a flat horizontal surface, a modified embodiment of first fixture is used in conjunction with a second fixture and a target. Such a modified first fixture 140 is shown in FIGS. 11–14. The second fixture 142 is shown in FIGS. 15–18 and 23–25, and the target 144, in FIGS. 19–22 and 23. FIG. 23 shows how those three major parts of the apparatus are associated with the vehicle during an off-line operation for completing antenna installation.

Fixture 140 differs from fixture 91 in that vertical bar 112 is longer, extending farther downward to provide a vertical through-slot 146 that is shown stopping short of the lower end of the bar, but optionally could extend to that end of the bar, although the option is not specifically shown in the drawings. Fixture 140 also differs in that it includes a first optical laser 148. Otherwise fixture 140 is exactly like fixture 91, with the same reference numerals being used designating the same individual parts.

The body of laser 148 is disposed below mounting platform 118 and attached to support bracket 116 in any suitable manner. Laser 148 is aimed so that, with fixture 140 located and clamped to antenna 68 in the manner described above for fixture 91, a first laser beam that it emits, when operated, will shine in a direction that, as viewed normal to a horizontal surface, on which the vehicle is disposed, is parallel to the direction of forward travel of the vehicle. So that it will shine on target 144 in a desired manner, as will be more fully explained later, the laser beam may be inclined slightly downward in relation to the antenna beam axis. Such inclination can be achieved by placing a tilt bar 152 between the body of the laser and the underside of mounting platform 118, as in FIG. 13.

FIG. 23 shows fixture 142 to comprise a generally rectangular framework 154 that can be rolled on wheels 156 at its four corners to place the fixture generally rearward of the vehicle on the same horizontal surface as the vehicle. Axle locator bars 158 extend forward of framework 154 on opposite sides of the framework outboard of opposite sides of the vehicle. Proximate their distal ends, the locator bars comprise respective axle locator pins 160. Each locator pin 160 can slide snuggly within a respective transverse hole in the respective locator bar. The inboard end of each pin comprises a pointed tip 162, and the outboard end, a handknob 164 for sliding the pin. Before either pin can be slid on its locator bar, a corresponding locking lever 166 must be untightened. One end of a respective suspension spring 168 is fastened to the respective locator bar near its distal end.

Fixture 142 further comprises a bridge bar 170 (see also FIGS. 16 and 17) that spans laterally opposite sides of framework 154 transverse to locator bars 158. A mounting 172 supports a second optical laser 174 from bridge bar 170. Mounting 172 is shown in more detail in FIGS. 15–18 to comprise a rectangular frame 176 having four sides, namely an upper horizontal side 178, a lower horizontal side 180, and two vertical sides 182, 184. Side 178 comprises a two-piece construction for capturing frame 176 on bridge bar 170 by disposing the bridge bar between the two pieces and then fastening the two pieces together. Lower horizontal side 180 is suspended from upper side 178 by vertical sides 182, 184.

The body of laser 174 is cradled in a carriage 186 that can be positioned along the length of lower side 180 (right-left in the vehicle) by a positioning mechanism 188, which may comprise a precision screw and nut drive for example. The arrangement of the various parts comprising fixture 142 is such that the direction of a laser beam emitted by laser 174, when on, as viewed normal to the horizontal surface on which the framework is disposed, is perpendicular to an imaginary line running between the pointed inner ends 162 of locator pins 160. Such perpendicularity is maintained as the laser position is adjusted by operation of mechanism 188.

Fixture 142 is associated with the vehicle in the following way, as portrayed by FIG. 23. The vehicle is placed on a flat horizontal surface 192. If the vehicle has an air suspension system, that system is set to the ride height. Framework 154 is positioned behind the center rear of the vehicle. Each locking lever 166 is untightened, and locator pins 160 are positioned on locator bars 158 to spread their inner ends 162 far enough apart to clear the ends of a rear drive axle 190 of the vehicle. The fixture is then positioned to bring locator pins 160 into at least approximate alignment with the ends of axle 190. The free ends of springs 168 may hooked onto the tops of the treads of tires on wheels mounted on the ends of axle 190 to aid in supporting locator bars 158 while locator pins 160 are being aligned with the ends of the axle. Pins 160 are then slid inward on the locator bars to insert their inner ends 162 into holes in the ends of the axle hubs. Those holes are centered on the axle centerline, which is perpendicular to the direction of travel of the vehicle when the steered front wheels of the vehicle are parallel to the wheels on axle 190. Pins 160 are dimensioned to fit closely to the axle hub holes.

With pins 160 fitted fully to the axle hub holes, locking levers 166 are tightened to lock the pins to their locator bars 158. This assures that the laser beam from laser 174 will be perpendicular to the centerline of axle 190, as viewed in a direction normal to the horizontal surface 192 on which the vehicle and the fixture are both disposed. Some degree of departure of the beam from horizontal is acceptable so long as the beam can properly shine on target 144, as will be more fully explained later.

Detail of target 144 is shown in FIGS. 19–22. It comprises a stand formed by a base 194, a vertical support post 196, a target plate 198, and a spirit level 200. A lower end of post 196 is joined to the center of base 194 such that the post is supported upright on base 194 perpendicular to surface 192 when base 194 is placed on surface 192. Target plate 198 is disposed in front of and fastened to post 196 so as to also be disposed vertically, but in a manner that allows some degree of leveling for the purpose of securing a desired orientation of certain indicia on the front face of target plate 198 when needed.

A first fastener 202 passes through a hole near the top of target plate 198 to fasten the target plate to the post in a manner that allows the target plate to swing pendulously about the fastener. Near its bottom, target plate 198 has a horizontal through-slot 204. A second fastener 206 passes through slot 204 to fasten to post 196. With fastener 206 loose, slot 206 allows target plate 198 to swing to a limited extent about fastener 202.

The target plate indicia referred to earlier comprises two horizontally spaced vertical lines 208, 210 bounding a zone 212. A third vertical line 214 may also be present bisecting the zone. Spirit level 200 is fastened to the front face of target plate 198 such that when lines 208, 210, 214 are vertical, its bubble will indicate that it is horizontal.

Consequently, when target 144 is placed on surface 192 with the front face of target plate 198 confronting the front of the vehicle, failure of the spirit level bubble to indicate horizontal signifies that lines 208, 210, and 214 are out-of-vertical. Such a situation is corrected by loosening fastener 206 to allow the target plate to swing, or be swung, about fastener 202 to a position that makes the three lines vertical. Fastener 206 is then tightened.

The foregoing description enables the inventive method represented by FIG. 23 to now be more fully described. After the proper angle of elevation has been set using fixture 140 in the same manner already described for fixture 91, fixture 142 is used in association with the vehicle to place laser 174 in a position that is at least near the imaginary vertical plane that passes centrally through the length of the vehicle. Fixture 140 places laser 148 and slot 146 in bar 112 substantially at that same plane. Positioning mechanism 188 is operated as required to position laser 174 such that its beam passes through slot 146. This will assure that the beams from both lasers 148, 174, when on, are essentially in a common vertical plane that is perpendicular to the centerline of axle 190. Before front laser 148 is turned on, target 144 is placed such that the laser beam from rear laser 174 shines on line 214. The target is leveled, as needed, to assure that the lines 208, 210, 214 are vertical.

When laser 148 is then turned on, both laser beams should shine on zone 212 of target plate 198, confirming that antenna 68 is correctly positioned in azimuth, being aimed in azimuth essentially along the thrust angle of the vehicle. If the angle reading presented on display 122 of indicator 120 also is within the tolerance range mentioned above, antenna 68 is correctly positioned in elevation.

In actual practice in a heavy truck assembly plant, an antenna 68 is typically assembled to a truck without fully tightening fasteners 86, 88 on either side as the truck moves along an assembly line. The invention is practiced in an off-line operation, represented by FIG. 23.

Analysis of assembly operations performed in that plant has shown that the dimensional tolerances of parts that form chassis frame 52 are likely to assure that an antenna is properly positioned in azimuth when the truck is moved off-line. Consequently, a need for adjustment of the antenna in azimuth is considered quite unlikely. Hence, extension of the invention for verifying proper alignment in azimuth is used chiefly for quality audit purposes, rather than checking every antenna installation. When azimuth verification is used however, off-line placement of the truck on surface 192 for finalizing the angle of elevation of antenna 86 will, with laser 174 positioned to shine its beam through slot 146, result in both beans shining within zone 212.

Prior to any azimuth verification, the antenna is secured with proper angle of elevation, indicated on display 122. To the extent that the angle of elevation might be out of tolerance, slots 84 allow antenna 86 to be pivoted about fasteners 86 to position it within tolerance. Once the angle is within tolerance, all four fasteners 86, 88 are tightened, completing the procedure.

Figure 4:
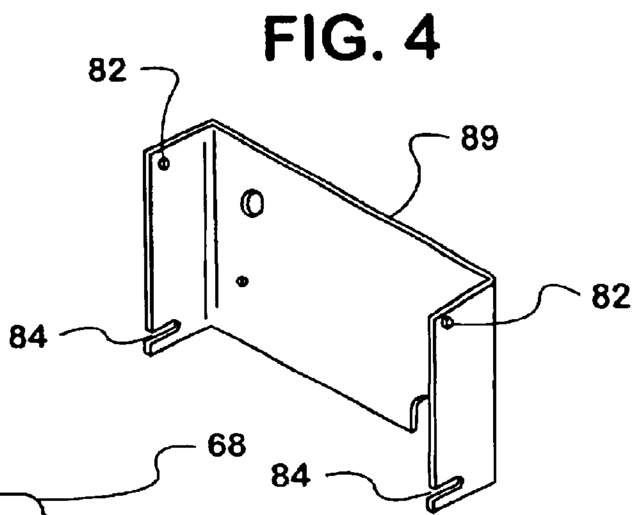
FIG. 4 is a perspective view of a single part providing an equivalent mounting of the antenna on the undercarriage.

The nature of the antenna mounting via brackets 64, 66, or alternately the one-piece bracket 89 shown in FIG. 4, also allows slight adjustment in azimuth, which may be sufficient to bring the antenna into proper azimuth position. Personnel performing the adjustment can grasp the antenna and carefully manipulate it as allowed by loosely tightened fasteners. Once desired in tolerance relationships are attained, the fasteners are fully tightened. Subsequent confirmation is obtained by observation of both laser beams striking zone 212 and an in-tolerance reading on display 122.

When fixture 91 alone is used, there is no need for the two laser-carrying fixtures or the target. Any angle of elevation adjustment that may be needed is performed in the same manner as previously described.

Figure 26B:
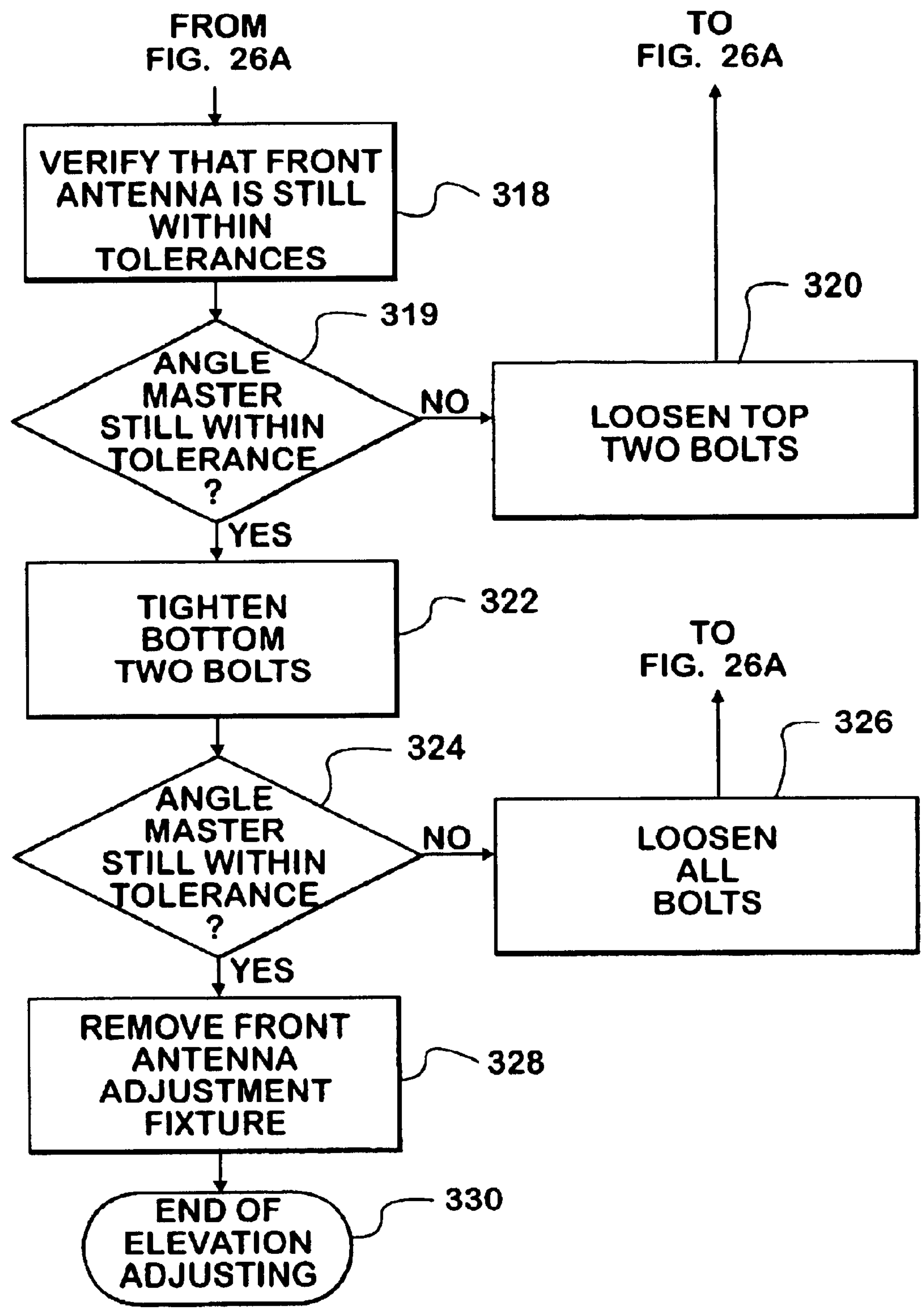

FIGS. 26A and 26B illustrate a sequence of steps in an example of a procedure for measuring, and if needed setting, the angle of elevation of antenna 86 in a truck like the one shown in previous Figures. The first step 300 of FIG. 26A comprises moving the truck to a test location such as that shown and described with reference to FIG. 23. Once the truck has been parked on a horizontal surface, such as surface 192, the ride height is set, as indicated by step 302. If the vehicle does not have ride height control, step 302 is unnecessary.

Step 304 next calls for loosening of the four fasteners 86, 88 if previously fully tightened. Steps 306 and 308 together call for mounting fixture 140 on antenna 86 in the manner described earlier. Step 310 comprises turning on indicator 120 to measure the angle of elevation.

The following step 312 involves determining if the measurement is within tolerance. That is done simply by visual observation by personnel performing the measurement. If the measurement is within tolerance, then the top two fasteners 86 on right and left sides are tightened as represented by a step 314. That the measurement is still within tolerance is determined by visual observation of display 122 (steps 318, 319, FIG. 26B). If the measurement shows out of tolerance, then the tightened fasteners 86 are loosened (step 320) and antenna 86 is re-adjusted, as described earlier, (step 316) until the measurement is brought into tolerance.

Once step 319 has disclosed proper alignment, the bottom two fasteners 88 on right and left sides are tightened (step 322). That the measurement is still within tolerance is determined by visual observation of display 122 (step 324). If the measurement shows out of tolerance, then all fasteners 86, 88 are loosened (step 326) and antenna 86 is re-adjusted, as required, using the steps 312 through 324 as appropriate, until the measurement of step 324 discloses an in-tolerance result with all fasteners tightened. The final step 328 comprises unclamping and removal of fixture 91 after which the process of FIGS. 26A and 26B ends (numeral 330).

Figure 27A:
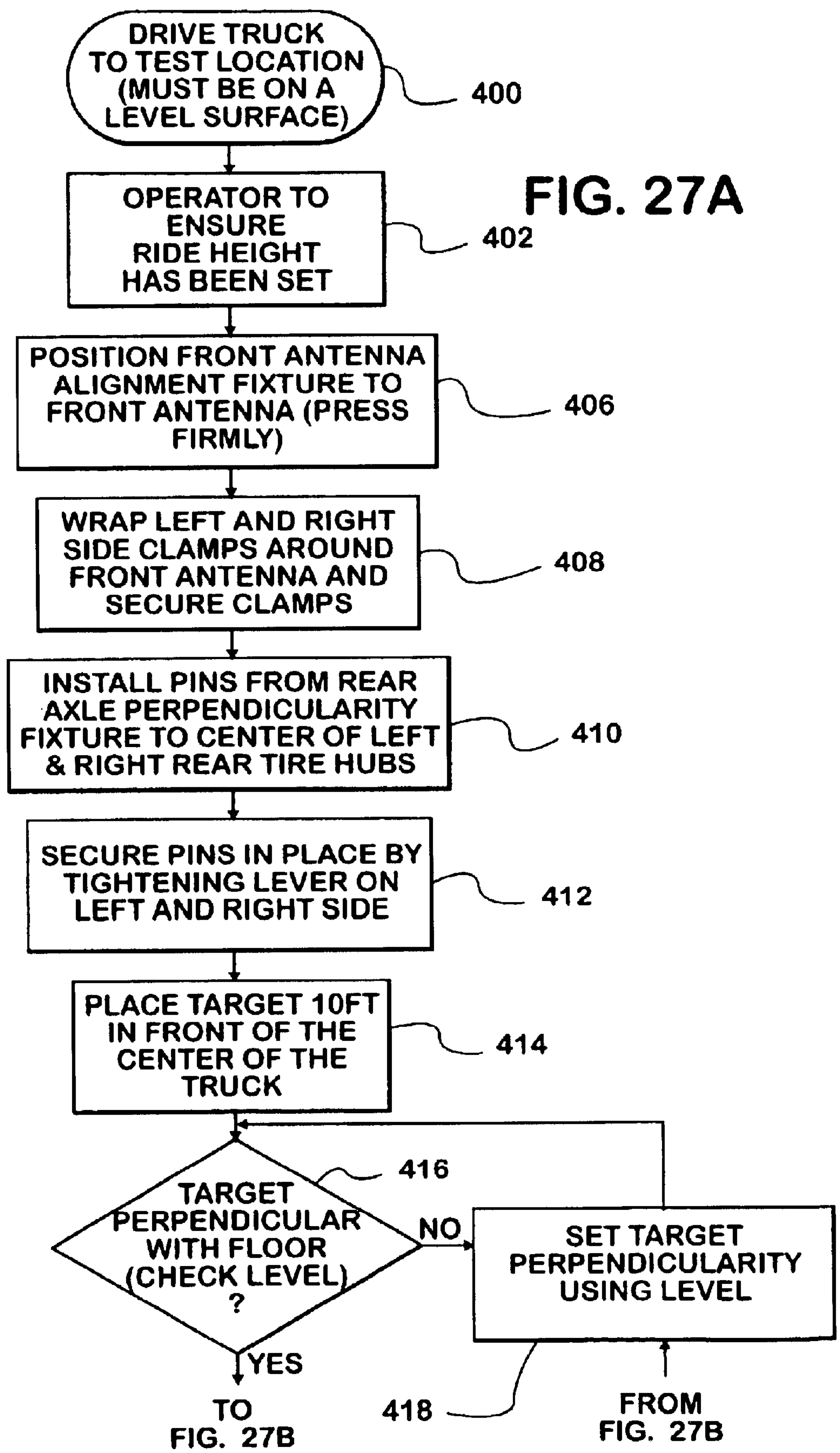
FIGS. 27A, 27B, and 27C collectively form a flow diagram of steps in the practice of another portion of the method.
Figure 27B:
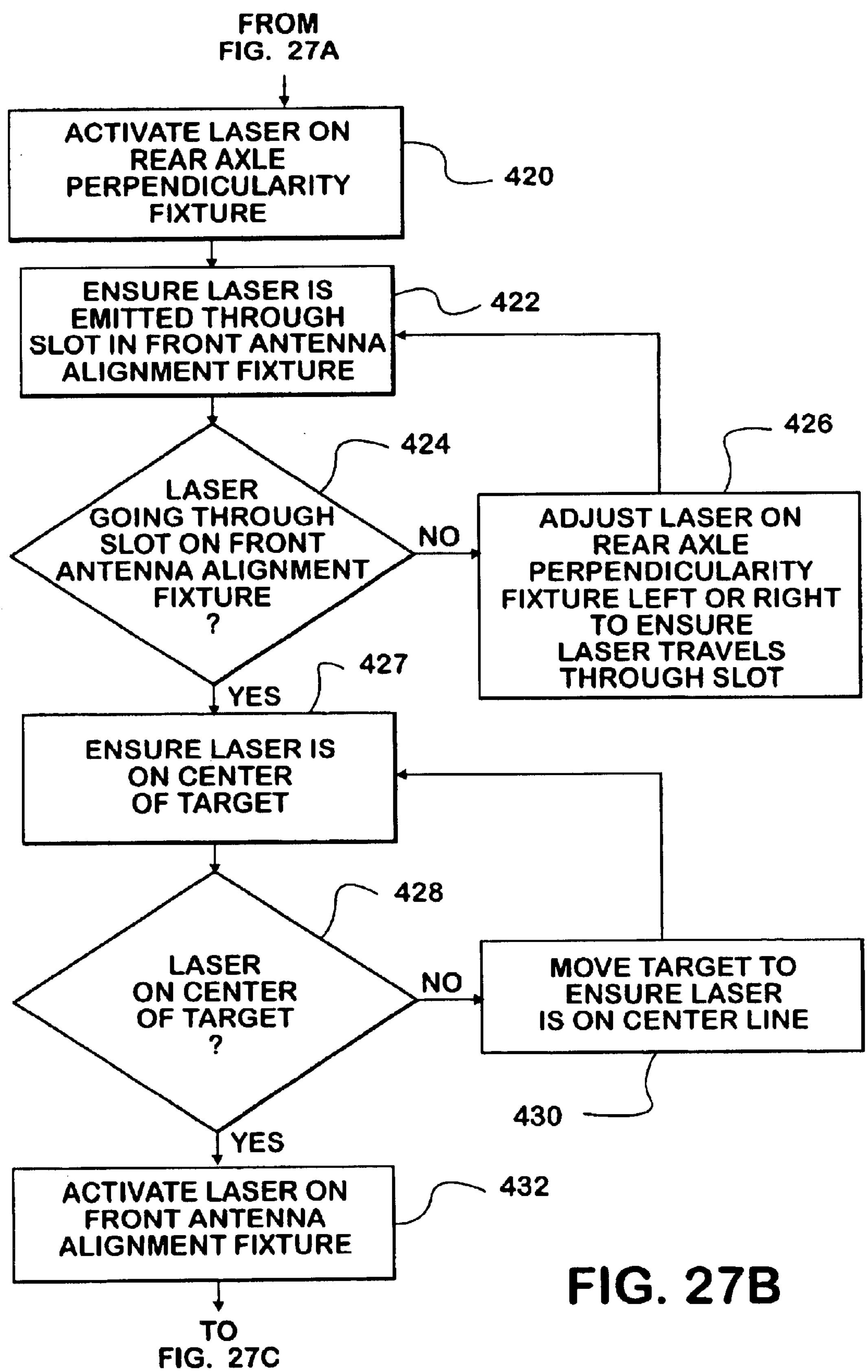
Figure 27C:
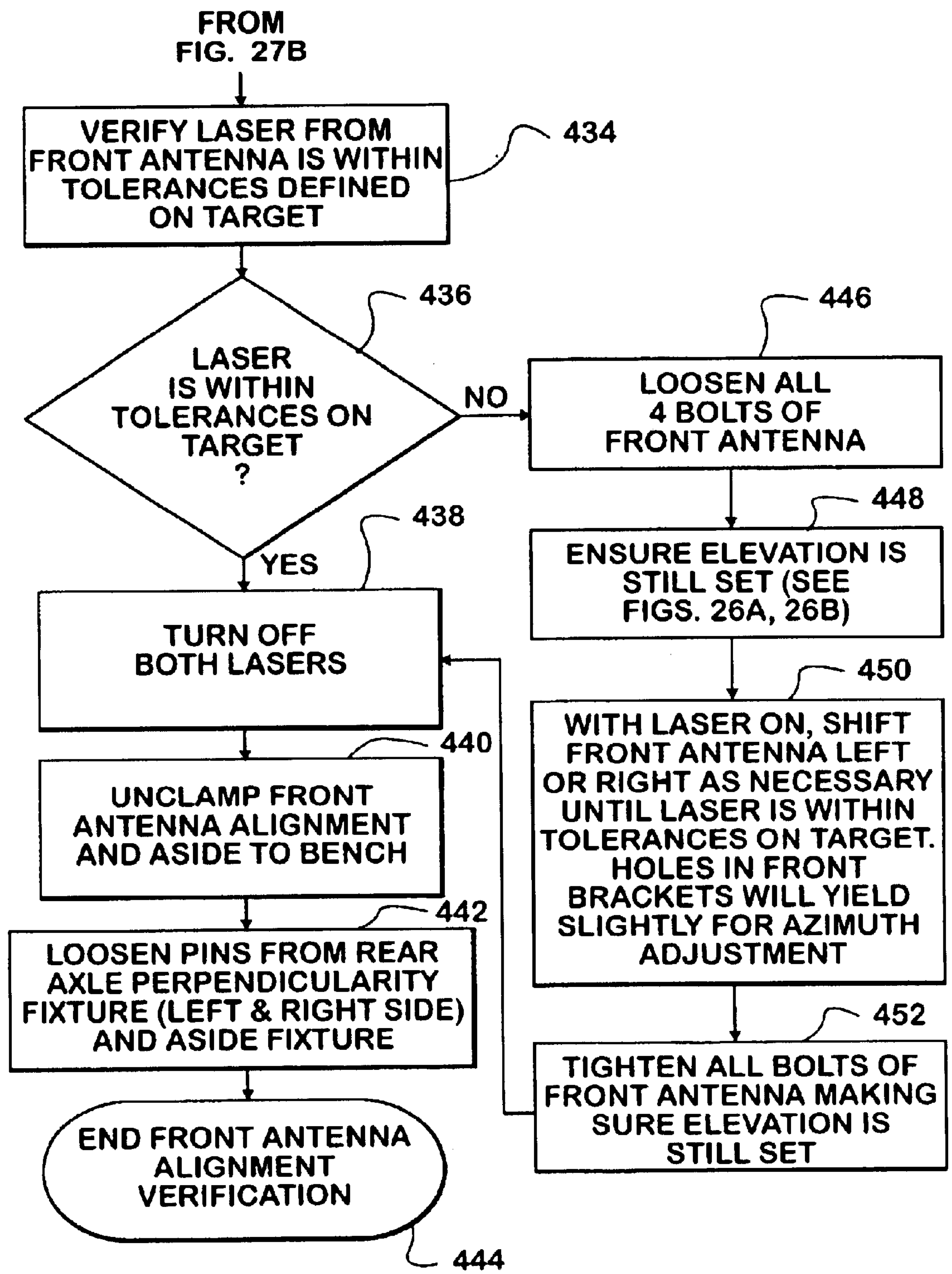

FIGS. 27A, 27B, and 27C illustrate a sequence of steps for verifying the azimuth of the antenna beam axis once fasteners 86, 88 have been fully tightened to secure the antenna with the beam axis at the proper angle of elevation. If fixture 91 was used, it is removed and replaced by fixture 142, as described earlier. Alternatively, fixture 142 could be used to set the proper angle of elevation and remain in place.

In FIG. 27A, steps 400, 402, 406, and 408 correspond to steps 300, 302, 306, and 308, previously described. Steps 410, 412 show that fixture 142 is associated with the truck in the manner described earlier. Steps 414, 416, 418 involve placing and leveling target 144, as described earlier. Laser 174 is then turned on (step 420, FIG. 27B). Steps 422, 424, performed by visual observation by personnel, ensure that the beam from laser 174 is passing through slot 146. If not, positioning mechanism 188 must be adjusted to re-position laser 174 on fixture 142 so that its beam passes through slot 146 (step 426).

Once step 424 has determined that laser 174 is shining through slot 146, it is necessary for personnel to observe that its beam is shining within zone 212 on target 144 (steps 427, 428). If not, the target is re-positioned on surface 192 (step 430) so that the beam shines within zone 212. Once step 428 has determined that the beam is shining within zone 212, laser 148 is turned on (step 432).

Steps 434, 436, (FIG. 27C) are performed visually by personnel to verify that the beam from laser 148 is within zone 212. If it is, both lasers are turned off (step 438), and fixtures 140, 142 are removed (steps 440, 442) to complete the process (step 444). If the beam from laser 148 is not within zone 212, then steps 446, 448, 450, and 452 are performed before steps 438, 440, 442, and 444 conclude the process.

While a presently preferred embodiment of the invention has been illustrated and described, it should be appreciated that principles of the invention apply to all embodiments falling within the scope of the following claims.

What is claimed is:

1. A method for measuring the angle of elevation of the beam axis of a front-looking radar antenna on a land vehicle and verifying the azimuth of the beam axis, the method comprising:

securing to the antenna a first fixture that comprises both an indicator for indicating angle of elevation and a first optical laser that emits a first laser beam to aim the first laser beam in a direction that, as viewed normal to a horizontal surface on which the vehicle is disposed for travel, is parallel to the beam axis of the antenna and to shine the first laser beam on a target spaced frontally of the vehicle in a direction of forward vehicle travel;

securing to the vehicle a second fixture that comprises a second optical laser that emits a second laser beam to aim the second laser beam in a direction that, as viewed normal to the horizontal surface, is parallel to the direction of forward vehicle travel and to shine the second laser beam on the target; and using the angle of elevation indicated by the indicator as a measure of the angle of elevation of the beam axis of the antenna and verifying the azimuth of the beam axis when the two laser beams are shining in a predetermined relationship to each other on the target.

2. A method as set forth in claim 1 wherein the antenna comprises a perimeter rim, the first fixture comprises a locator comprising a perimeter frame congruent to the antenna perimeter rim, and the step of securing the first fixture to the antenna comprises congruently fitting the perimeter frame of the locator to the perimeter rim of the antenna so that the beam axis passes through an open area of the perimeter frame of the locator and securing the perimeter frame of the locator to the antenna by releasably clamping the perimeter frame of the locator to the antenna.

3. A method as set forth in claim 2 wherein the first fixture comprises a bar depending vertically from the perimeter frame of the locator and having a vertical through-slot that is below the perimeter frame and that is open in the direction of forward travel of the vehicle, and the step of securing the second fixture to the vehicle comprises positioning the second laser on the second fixture to correlate the second laser beam to the first laser beam by causing the second laser beam to pass through the through-slot in the bar.

4. A method as set forth in claim 3 wherein the step of securing the second fixture to the vehicle comprises securing the second fixture to an axle of the vehicle that propels the vehicle in the forward direction of travel by locating the second fixture to a centerline of the axle that is perpendicular to the forward direction of travel.

5. A method as set forth in claim 1 wherein the target comprises a vertical face on which the two laser beams shine and which contains indicia defining the predetermined relationship of each laser beam to the other, and the step of verifying the azimuth of the beam axis comprises verifying the azimuth of the beam axis when both laser beams are shining in predetermined relationship to the indicia on the vertical face of the target.

6. A method as set forth in claim 5 wherein the first fixture comprises a bar depending vertically from the perimeter frame of the locator and having a vertical through-slot that is below the perimeter frame and that is open in the direction of forward travel of the vehicle, and the step of securing the second fixture to the vehicle comprises positioning the second laser on the second fixture to correlate the second laser beam to the first laser beam by causing the second laser beam to pass through the through-slot in the bar.

7. A method as set forth in claim 6 wherein the indicia comprise two horizontally spaced vertical lines bounding a zone, and the step of verifying the azimuth of the beam axis comprises verifying the beam axis when both laser beams are shining within the zone.

8. A method as set forth in claim 7 wherein the step of securing the second fixture to the vehicle comprises securing the second fixture to an axle of the vehicle that propels the vehicle in the forward direction of travel by locating the second fixture to a centerline of the axle that is perpendicular to the forward direction of travel.

9. A method as set forth in claim 8 wherein the step of securing the second fixture to the vehicle comprises disposing the second laser such that the second laser beam passes through the undercarriage of the vehicle.

10. A method as set forth in claim 1 wherein if the measure of the angle of elevation of the beam axis of the antenna is out of tolerance, then performing a step of adjusting the antenna to bring the measure within tolerance.

11. A method for measuring the angle of elevation at which a device mounted on a land vehicle radiates electromagnetic radiation along a beam axis that, as viewed normal to a horizontal surface on which the vehicle is disposed for travel, is parallel to a direction of travel of the vehicle along the surface and for verifying the azimuth of the beam axis, the method comprising:

securing to the device a first fixture that comprises both an indicator for indicating angle of elevation and a first optical laser that emits a first laser beam to aim the first laser beam in a direction that, as viewed normal to the horizontal surface, is parallel to the beam axis of the electromagnetic radiation radiated by the device and to shine the first laser beam on a target spaced from the device;

securing to the vehicle a second fixture that comprises a second optical laser that emits a second laser beam to aim the second laser beam in a direction that, as viewed normal to the horizontal surface, is parallel to the direction of travel of the vehicle and to shine the second laser beam on the target; and using the angle of elevation indicated by the indicator as a measure of the angle of elevation of the beam axis of the electromagnetic radiation radiated by the device, and verifying the azimuth of the beam axis when the two laser beams are shining in a predetermined relationship to each other on the target.

12. A method as set forth in claim 11 wherein the device comprises an antenna facing in the direction of travel of the vehicle and defining the beam axis of the electromagnetic radiation emitted by the device and a perimeter rim bounding the antenna, and the step of securing the first fixture to the device comprises congruently fitting a locator of the first fixture to the perimeter rim of the device so that the beam axis passes through an aperture in the locator and securing the locator to the device.

13. A method as set forth in claim 12 wherein the step of securing the locator to the device comprises releaseably securing the locator to the device by operating one or more toggle clamp mechanisms to releaseably engage the device.

14. A method as set forth in claim 12 wherein the first fixture further comprises a reference for referencing the second laser beam to the first fixture, and including, after the step of securing the second fixture to the vehicle, a further step of positioning the second laser on the second fixture to cause the second laser beam to pass through the first fixture in predetermined relation to the reference.

15. A method as set forth in claim 14 wherein the first fixture comprises a bar depending vertically from the locator, and the reference comprises a vertical through-slot in the bar below the locator and open in the direction of travel of the vehicle, and the further step of positioning the second laser on the second fixture comprises positioning the second laser horizontally on the second fixture to cause the second laser beam to pass through the through-slot in the bar.

16. A method as set forth in claim 11 wherein the step of securing the second fixture to the vehicle comprises securing the second fixture to an axle of the vehicle that propels the vehicle in the direction of travel by locating the second fixture to a centerline of the axle that is perpendicular to the direction of travel.

17. A method as set forth in claim 11 wherein the target comprises a vertical face on which the two laser beams shine and which contains indicia defining the predetermined relationship of each laser beam to the other, and the step of verifying the azimuth of the beam axis comprises verifying the azimuth of the beam axis when both laser beams are shining in predetermined relationship to the indicia on the vertical face of the target.

18. A method as set forth in claim 17 wherein the indicia comprise two horizontally spaced vertical lines bounding a zone, and the step of verifying the azimuth of the beam axis comprises verifying the beam axis when both laser beams are shining within the zone.

19. Apparatus for measuring the angle of elevation at which a device mounted on a land vehicle radiates electromagnetic radiation along a beam axis that, as viewed normal to a horizontal surface on which the vehicle is disposed for travel, is parallel to a direction of travel of the vehicle along the surface, the apparatus comprising:

a fixture that comprises a locator for fitting congruently to a perimeter rim of the device and a mechanism for releaseably securing the locator to the device to correlate the locator to the angle of elevation of the device, and an indicator mounted on the locator for indicating angle of elevation of the locator, and hence angle of elevation of the beam axis of the device.

20. Apparatus as set forth in claim 19 wherein the locator comprises a perimeter frame bounding an aperture, the apparatus further comprises a bar fastened to the locator frame to span the frame aperture and an indicator support fastened to the bar and comprising a mounting platform extending transversely away from the locator, and wherein the indicator is mounted on the mounting platform.

21. Apparatus as set forth in claim 20 wherein the perimeter frame is rectangular in shape to endow the perimeter frame with four sides, the bar spans the aperture between a pair of opposite ones of the four sides, and the mechanism for releaseably securing the locator to the device comprises a respective toggle clamp mechanism at each of the other pair of the four sides.

22. Apparatus as set forth in claim 21 wherein the perimeter frame comprises UHMW plastic.

23. Apparatus as set forth in claim 20 further including an optical laser mounted on the mounting platform.

24. Apparatus as set forth in claim 23 wherein the indicator is disposed in overlying relation to the mounting platform and the optical laser is disposed in underlying relation to the mounting platform.

25. Apparatus as set forth in claim 23 wherein the perimeter frame is rectangular in shape to endow the perimeter frame with four sides, two of which are vertical and two of which are horizontal, the bar is disposed lengthwise vertically to span the aperture between the horizontal sides of the frame and to extend vertically below a vertically lower one of the two horizontal sides, and the bar comprises a reference disposed vertically below the lower one of the two horizontal sides of the frame for referencing the fixture to a laser beam from another optical laser.

26. Apparatus as set forth in claim 25 wherein the reference comprises a vertically extending through-slot in the bar.

27. Apparatus as set forth in claim 19 wherein the fixture comprises a first optical laser, and the apparatus further includes a second optical laser and an additional fixture for placing the second laser with reference to a centerline of an axle of the vehicle that propels the vehicle in the direction of travel to place a path of a laser beam from the second laser, as viewed normal to the surface, parallel to the direction of travel.

28. Apparatus as set forth in claim 27 wherein the fixture that comprises a locator for fitting congruently to a perimeter rim of the device further comprises a bar that extends lengthwise vertically downward from the locator and comprises a vertically extending through-slot disposed in the path of the laser beam from the second laser.

29. Apparatus as set forth in claim 28 wherein the additional fixture comprises opposing locator pins for locating the additional fixture to opposite ends of the axle at the axle centerline, a bridge spanning the opposing locator pins, and a mounting for the second laser on the bridge, including a mechanism for selectively positioning the second laser in its mounting on the bridge in a direction parallel with the axle centerline.

30. Apparatus as set forth in claim 29 further including a target for placement in spaced relation to the two lasers to dispose a face of the target in respective paths of the laser beams from the two lasers, and wherein the target face comprises indicia defining a zone representing a predetermined relation between the two laser beams suitable for verifying the azimuth of the beam axis when both laser beams are striking the zone.

31. Apparatus as set forth in claim 30 wherein the indicia comprise two horizontally spaced vertical lines bounding the zone, and further including an upright stand for supporting the target on the surface, an indicator for indicating departure of the two horizontally spaced vertical lines from vertical, and an adjustment for adjusting the target on the stand to zero any indicated departure from vertical.

* * * * *